United States Patent
Kambe et al.

(10) Patent No.: US 7,922,875 B2
(45) Date of Patent: Apr. 12, 2011

(54) METHOD AND APPARATUS FOR ENRICHMENT OF HEAVY OXYGEN ISOTOPES

(75) Inventors: Takashi Kambe, Tsutiura (JP); Hitoshi Kihara, Chiba (JP); Norihisa Nara, Tsutiura (JP); Hiroshi Kawakami, Tsutiura (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 160 days.

(21) Appl. No.: 12/441,969

(22) PCT Filed: Sep. 20, 2007

(86) PCT No.: PCT/JP2007/068253
§ 371 (c)(1),
(2), (4) Date: Mar. 19, 2009

(87) PCT Pub. No.: WO2008/038561
PCT Pub. Date: Apr. 3, 2008

(65) Prior Publication Data
US 2009/0266702 A1    Oct. 29, 2009

(30) Foreign Application Priority Data
Sep. 26, 2006 (JP) ................. 2006-260894

(51) Int. Cl.
*B01D 59/04* (2006.01)
*B01D 59/34* (2006.01)
*B01D 59/50* (2006.01)
*C01B 13/00* (2006.01)
*F25J 3/02* (2006.01)

(52) U.S. Cl. ............ 203/5; 62/643; 62/901; 62/919; 202/155; 202/158; 202/172; 204/157.2; 204/157.22; 422/186.07; 423/581; 423/DIG. 7; 203/71

(58) Field of Classification Search .......... 62/643, 62/901, 919; 202/155, 158, 160, 172; 203/2, 203/5, 71; 204/157.2, 157.22, 666; 422/186.07; 423/581, DIG. 7
See application file for complete search history.

(56) References Cited

U.S. PATENT DOCUMENTS
6,461,583 B1 * 10/2002 Hayashida et al. .......... 423/579
6,835,287 B1 * 12/2004 Kihara et al. ............... 202/154
7,638,059 B2 * 12/2009 Kim et al. ................... 210/651
2006/0249366 A1   11/2006 Hayashida FOREIGN PATENT DOCUMENTS
JP     62-298402     12/1987
(Continued)

OTHER PUBLICATIONS
International Search Report for PCT/JP2007/068253, mailed Oct. 30, 2007.

*Primary Examiner* — Virginia Manoharan
(74) *Attorney, Agent, or Firm* — Nixon & Vanderhye P.C.

(57) ABSTRACT

A method of enriching a heavy oxygen isotope by distillation of the present invention includes: a first distillation step of feeding oxygen and ozone generated by an ozonizer 12 into a distillation column 13 filled with a diluent gas, and separating the oxygen, and the ozone and the diluent gas; a photodecomposition step of introducing a mixed gas of the ozone and the diluent gas from a bottom of the distillation column into a photoreaction cell 14, and irradiating the mixed gas with a laser light to selectively decompose the ozone containing the heavy oxygen isotope; and a second distillation step of returning non-decomposed ozone and oxygen containing the heavy oxygen isotope to the distillation column, and separating the oxygen, and the ozone and the diluent gas.

6 Claims, 3 Drawing Sheets

FOREIGN PATENT DOCUMENTS

| | | |
|---|---|---|
| JP | 2000-271450 | 10/2000 |
| JP | 2004-261776 | 9/2004 |
| JP | 2005-40668 | 2/2005 |
| WO | 00/27509 | 5/2000 |
| WO | 2004/078325 | 9/2004 |

* cited by examiner

METHOD AND APPARATUS FOR ENRICHMENT OF HEAVY OXYGEN ISOTOPES

TECHNICAL FIELD

The present invention relates to a method and an apparatus for the enrichment of heavy oxygen isotopes, and more specifically, relates to a method and an apparatus that use a photodecomposition reaction of ozone caused by laser light to achieve enrichment of the heavy oxygen isotopes $^{17}O$ and $^{18}O$ that have extremely low abundance ratios.

Priority is claimed on Japanese Patent Application No. 2006-260894, filed Sep. 26, 2006, the content of which is incorporated herein by reference,

BACKGROUND ART

The heavy oxygen isotopes $^{17}O$ and $^{18}O$ are used as tracers in applications such as the diagnosis of adult diseases. Because the abundance ratios of these heavy oxygen isotopes in nature are extremely low, techniques such as those outlined below are used to conduct enrichment prior to use.

One example of an enrichment method for a heavy oxygen isotope is a method in which oxygen is distilled in a molecular state, and the oxygen containing the target oxygen isotope is gradually enriched (see Patent Document 1). This document also discloses a method of combining the distillation with isotope scrambling in order to increase the efficiency of the isotope enrichment achieved by the distillation.

As examples of applications of this method of combining isotope scrambling, Patent Document 2 and Patent Document 3 disclose enrichment methods that utilize the selective decomposition of ozone containing the target isotope. Specifically, ozone generated by an ozonizer is irradiated with a laser light, and following selective decomposition of those ozone molecules containing the target heavy oxygen isotopes ($^{17}O$ and/or $^{18}O$), the generated oxygen is separated from the non-decomposed ozone, and then subjected to distillation to enrich the target oxygen isotopes in the form of oxygen molecules ($^{16}O^{17}O$, $^{16}O^{18}O$, $^{17}O^{17}O$, $^{17}O^{18}O$, $^{18}O^{18}O$).

Furthermore, Patent Document 3 discloses a method in which a rare gas such as krypton, xenon or radon is mixed with the target ozone at the time of laser irradiation to enable more stable decomposition of the ozone.

The method of enriching heavy oxygen isotopes by irradiation with laser light is conducted, for example, as illustrated in FIG. 3.

The configuration shown in FIG. 3 includes a separation apparatus which, including recovery of the diluent gas, is composed of at least three distillation columns.

Raw material oxygen is supplied to an ozonizer 1, and a portion of the oxygen is converted to ozone by the ozonizer 1, generating a mixed gas of ozone and unreacted oxygen. This mixed gas is introduced into a first distillation column 2 together with a diluent gas, and the mixture is separated into oxygen and a mixture of ozone and the diluent gas. The oxygen is extracted from the top of the column, and the mixture of ozone and the diluent gas is extracted from the bottom of the column.

The mixture of ozone and diluent gas separated by the first distillation column 2 is introduced into a photoreaction cell 3. Laser light of a specific wavelength is irradiated into the photoreaction cell 3, thereby selectively decomposing ozone containing the target heavy oxygen isotopes ($^{17}O$ and/or $^{18}O$) and generating oxygen containing those target isotopes.

The mixed gas, which includes oxygen containing a target heavy oxygen isotope within the molecule, non-decomposed ozone and the diluent gas, is liquefied within a liquefaction pressure vessel 4, and following pressurization, is introduced into a second distillation column 5. The mixed gas is separated into the target product oxygen and a mixture of ozone and the diluent gas, and the target product oxygen is extracted from the top of the column. The separated mixed gas of ozone and the diluent gas is extracted from the bottom of the column, and introduced into an ozone decomposition device 6, where the ozone is decomposed to generate oxygen. The mixed gas withdrawn from the ozone decomposition device 6 is separated into the diluent gas and oxygen in a third distillation column 7. The oxygen is expelled from the system, whereas the diluent gas is returned to the first distillation column 2 and reused.

[Patent Document 1] International Patent Publication WO00-27509

[Patent Document 2] Japanese Unexamined Patent Application, First Publication No. 2004-261776

[Patent Document 3] Japanese Unexamined Patent Application, First Publication No. 2005-40668

DISCLOSURE OF INVENTION

Problems to be Solved by the Invention

In the conventional technology shown in FIG. 3, at least three distillation columns are used, and these columns are connected in series in accordance with the process sequence.

Generally, during distillation, the liquid must be retained within the column for a certain period (hold-up). If the distillation columns are connected in series in the manner described above, then the liquid must be held in each of the columns in sequence, starting with the most upstream column, meaning the columns cannot be started simultaneously. Accordingly, a problem arises in that considerable time is required to obtain the desired product.

In particular the gas volume per unit time obtained from the photoreaction cell 3 is quite small, meaning only a low flow rate can be expected for the feed to the second distillation column 5. In low-temperature distillation, if an adequate quantity of circulating gas cannot be ensured, then the inside of the distillation column does not cool, and considerable time is required to reach normal operating conditions. Increasing the size of the photoreaction cell 3 is one possibility for increasing the gas volume, but this increases both the size and the cost of the apparatus, and is not particularly desirable.

Another problem is that because the photodecomposition of the ozone in the photoreaction cell 3 is conducted under reduced pressure, the liquefaction pressure vessel 4 must be provided between the photoreaction cell 3 and the second distillation column 5. However, compressing liquefied ozone mechanically using a pump or the like is not very desirable from a safety perspective.

Furthermore, with this type of series connection of the distillation columns, a low flow rate of gas must be controlled under reduced pressure throughout the entire system, which makes measurements and valve operations extremely difficult, and is likely to make it difficult to achieve stable operating control.

Accordingly, an object of the present invention is to provide enrichment of heavy oxygen isotopes in which the entire apparatus can be kept compact, enabling a reduction in equipment costs, and in which the operation is safe and can be conducted with good stability.

Means to Solve the Problems

In order to achieve the above object,
a first aspect of the present invention provides a method of enriching a heavy oxygen isotope by distillation, the method including:

a first distillation step (a) of feeding oxygen and ozone generated by an ozonizer into a distillation column filled with a diluent gas, and separating the oxygen, and the ozone and the diluent gas;

a step (b) of discharging the oxygen from a top of the distillation column;

a step (c) of depressurizing the distillation column;

a photodecomposition step (d) of introducing a mixed gas of the ozone and the diluent gas from a bottom of the distillation column into a photoreaction cell, and irradiating the mixed gas with a laser light to selectively decompose the ozone containing the heavy oxygen isotope;

a second distillation step (e) of returning non-decomposed ozone and oxygen containing the heavy oxygen isotope obtained in the step (d) to the distillation column, and separating the oxygen, and the ozone and the diluent gas;

a step (f) of liquefying the oxygen containing the heavy oxygen isotope using a condenser provided at the top of the distillation column, and extracting the oxygen as a product oxygen;

a step (g) of extracting the non-decomposed ozone from the distillation column, decomposing the ozone into oxygen using an. ozone decomposition device, and then returning the oxygen to the distillation column;

a third distillation step (h) of separating oxygen and the diluent gas; and a step (i) of externally discharging the oxygen separated in the step (h) from the system, wherein
the first through third distillation steps are all conducted within the same distillation column (i.e. a single distillation column).

In the present invention, the step (c) is preferably conducted by altering the operating conditions of the condenser.

Furthermore, the driving force for returning the gas to the distillation column in the step (d) is preferably generated by a pressure difference caused by a liquid head at the bottom of the distillation column.

A second aspect of the present invention is a heavy oxygen isotope enrichment apparatus for conducting the method of enriching a heavy oxygen isotope according to the present invention, the apparatus including at least:

an ozonizer that generates ozone from oxygen, a single distillation column that conducts the three steps (a), (e) and (h), a photoreaction cell that selectively decomposes the ozone containing the heavy oxygen isotope, and an ozone decomposition device.

In the present invention, the internal diameter at the bottom of the distillation column is preferably smaller than the internal diameters of other sections of the distillation column.

Further, a gas-liquid separation unit is preferably provided at the bottom of the distillation column.

EFFECT OF THE INVENTION

According to the present invention, because three distillation steps are conducted sequentially using a single distillation column, the size of the overall apparatus can be made very compact. Further, the quantity of diluent gas used for ensuring stable distillation can be reduced to approximately ⅓ of conventional quantities.

Furthermore, in the distillation column, because gas is recirculated to the photoreaction cell using the liquid head of accumulated liquid in the bottom of the column, a mechanical compressor is not required, which increases the safety of the apparatus.

DESCRIPTION OF THE REFERENCE SYMBOLS

11: Compressor, 12: Ozonizer, 13: Distillation column, 14: Photoreaction cell, 15: Ozone decomposition device, 16: Condenser, 17: Reboiler, 18: Laser device, 19: Bypass valve, 20: Liquid product storage tank, and 21: Gas-liquid separation unit

BEST MODE FOR CARRYING OUT THE INVENTION

Figure 1:
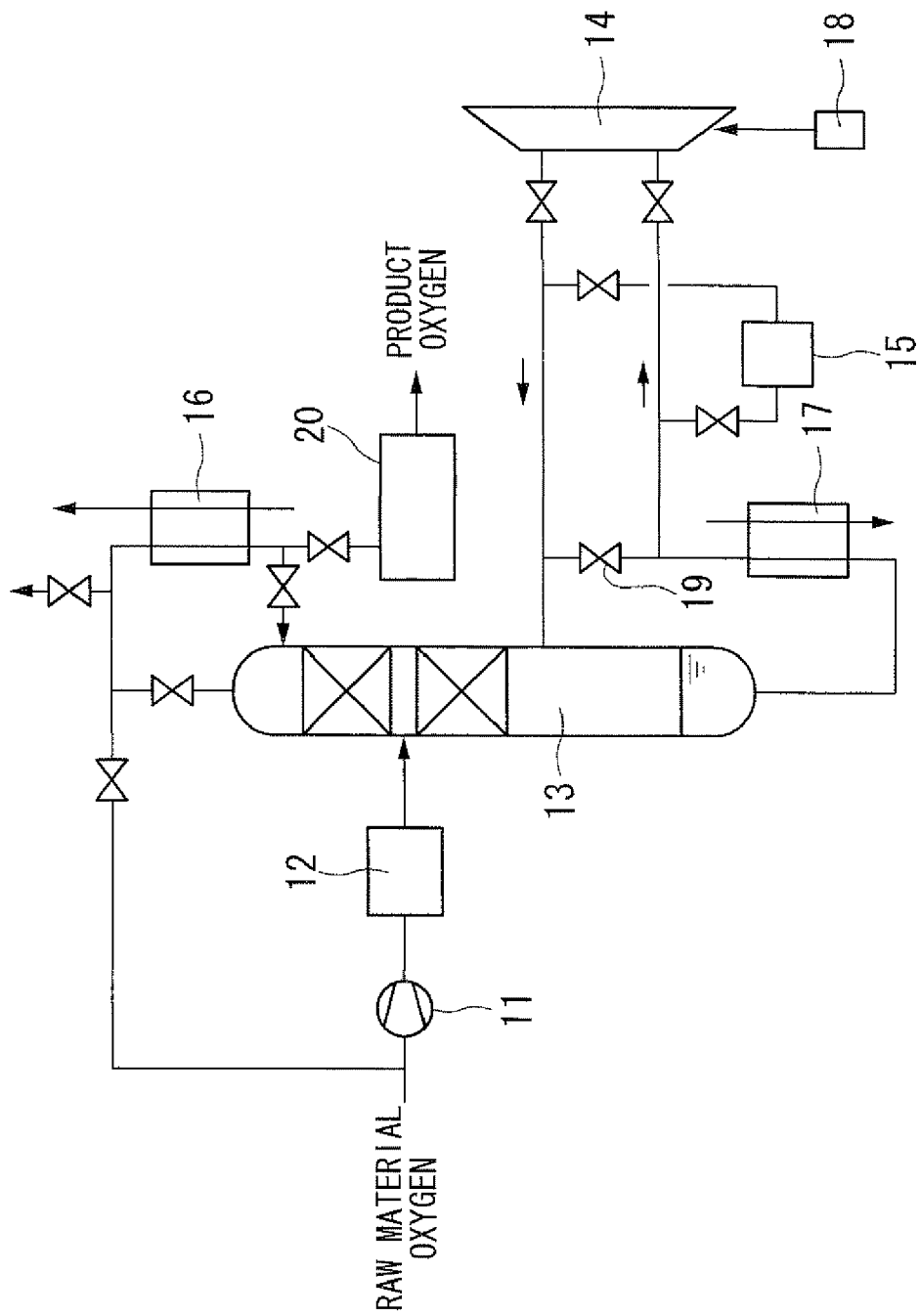
FIG. 1 is a schematic structural diagram illustrating one example of an enrichment apparatus of the present invention.

FIG. 1 illustrates one example of an enrichment apparatus for executing the method of enriching a heavy oxygen isotope according to the present invention.

The heavy oxygen isotope enrichment apparatus illustrated in FIG. 1 is composed essentially of a compressor 11, an ozonizer 12, a single distillation column 13, a photoreaction cell 14, and an ozone decomposition device 15. A condenser 16 and a reboiler 17 are provided at the top and the bottom respectively of the distillation column 13.

A feature of the present invention is the fact that three distillation steps are executed within the single distillation column 13.

In the first distillation step, the ozone is concentrated, in the second distillation step, the target isotope is enriched, and in the third distillation step, oxygen that contains none of the target isotope is separated from the diluent gas.
(First Distillation Step: Ozone Concentration)

A raw material oxygen is compressed using the compressor 11, and is then introduced into the ozonizer 12 to generate ozone.

The resulting mixed gas containing ozone and unreacted oxygen is fed into the distillation column 13. In order to ensure a safe and stable distillation, a diluent gas (such as krypton, xenon or a chlorofluorocarbon) is introduced into the distillation column 13 in advance. By passing a fluid (such as liquid nitrogen) through the condenser 16 and the reboiler 17 under appropriate temperature conditions, a downward liquid flow and an upward gas flow are generated inside the distillation column 13.

Following concentration of the oxygen at the top of the distillation column 13, the oxygen gas at the top of the column is gradually discharged. The extracted oxygen may simply be discharged outside the system, although if the oxygen is recirculated at a point upstream from the ozonizer 12, then the yield can be improved.

Once the ozone concentration in the bottom of the distillation column 13 has reached a predetermined concentration (within a range from several % to approximately 10%), supply of the mixed gas from the ozonizer 12 to the distillation column 13 is halted.

The distillation is continued, while residual oxygen gas remaining in the distillation column 13 is discharged from the system The concentration of diluent gas within the discharged gas gradually increases. In those cases where the diluent gas reacts inside the ozonizer 12, in order to prevent the generation of reaction products, the discharged gas is not recirculated into the ozonizer 12. However, the discharge gas may be collected outside the system, and fed directly into the distillation column 13 at the initial stage of the first distillation step. This type of method enables the oxygen and the diluent gas to be used more efficiently.

The gas concentration at the top of the distillation column 13 is measured, and the first distillation step is continued until oxygen is not detected at the top of the column. If oxygen remains within the column, then the concentration of the product oxygen in the second distillation step is diluted, and therefore as much oxygen as possible is discharged.

Once the oxygen has been satisfactorily discharged, the top of the distillation column 13 adopts a diluent gas rich state.

(Second Distillation Step: Product Oxygen Extraction)

Following completion of the oxygen discharge, the temperature of the cooling fluid (liquid nitrogen) supplied to the condenser 16 is lowered, and the inside of the distillation column 13 is placed under reduced pressure (negative pressure). At this time, the inside of the column is in a state of total reflux.

Once the pressure inside the distillation column 13 has been reduced to a predetermined pressure, a portion of the upward gas flow (a mixed gas of ozone and the diluent gas) from the reboiler 17 is introduced into the photoreaction cell 14. In the photoreaction cell 14, laser light of a specific wavelength is irradiated onto the gas from a laser device 18, thereby decomposing only isotopic ozone (such as $^{16}O^{16}O^{18}O$, $^{16}O^{17}O^{18}O$ and $^{16}O^{18}O^{18}O$) containing the target heavy oxygen isotope (for example $^{18}O$), and enriching the target isotope in the form of isotopic oxygen molecules.

In order to suppress molecular collisions between ozone molecules, the pressure inside the photoreaction cell 14 during irradiation is preferably not more than 13 kPa. There are no particular limitations on the lower limit for the pressure, as long as the present invention is able to be executed.

The remainder of the upward gas flow from the reboiler 17 is returned to the distillation column 13 via a bypass valve 19.

Following the photoreaction, the gas (a mixed gas of oxygen and non-decomposed ozone) is returned to the distillation column 13 from the photoreaction cell 14. Although there are no particular limitations on the position where the gas is returned to the distillation column 13, a position at the bottom of the column is preferred.

The second distillation step is conducted while the upward gas flow from the reboiler 17 is continuously supplied to the photoreaction cell 14 and returned to the distillation column 13, and the reacted gas from the photoreaction cell 14 is continuously returned to the distillation column 13. As this step proceeds, oxygen containing a high proportion of the target heavy oxygen isotope gradually accumulates at the top of the distillation column 13. This oxygen is cooled by the condenser 16 and circulated back into the distillation column 13 as a reflux liquid.

The gas circulation between the distillation column 13 and the photoreaction cell 14 is preferably conducted using the liquid head (liquid head pressure) of the downward liquid accumulated in the bottom of the distillation column 13. Conducting gas feeding using a liquid pump or compressor can cause decomposition of the ozone, and is therefore undesirable. At this point, if the internal diameter at the bottom of the column is smaller than the internal diameter of other sections of the distillation column 13, then a pressure difference can be generated with a small quantity of liquid.

Figure 2:
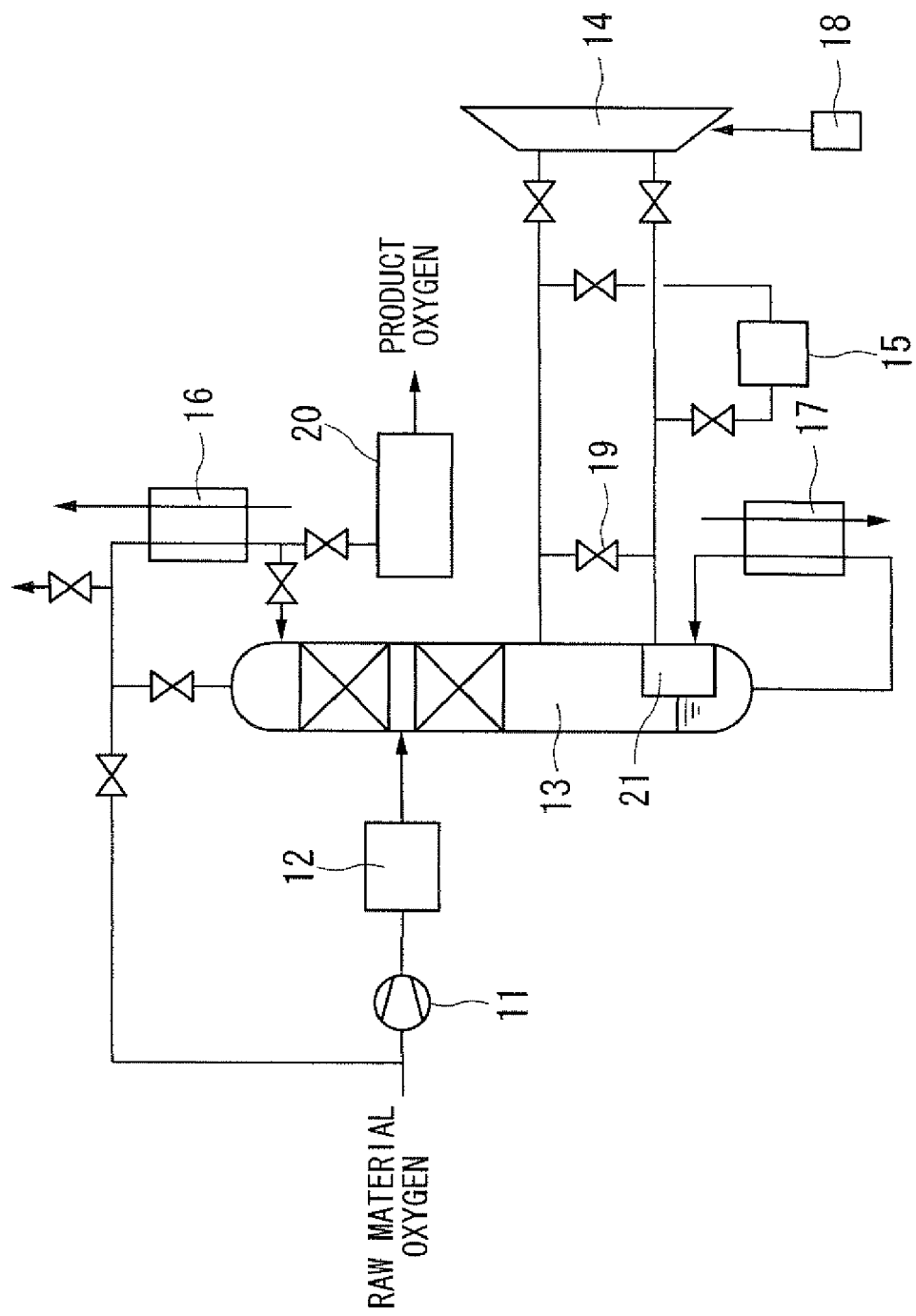
FIG. 2 is a schematic structural diagram illustrating another example of an enrichment apparatus of the present invention.
Figure 3:
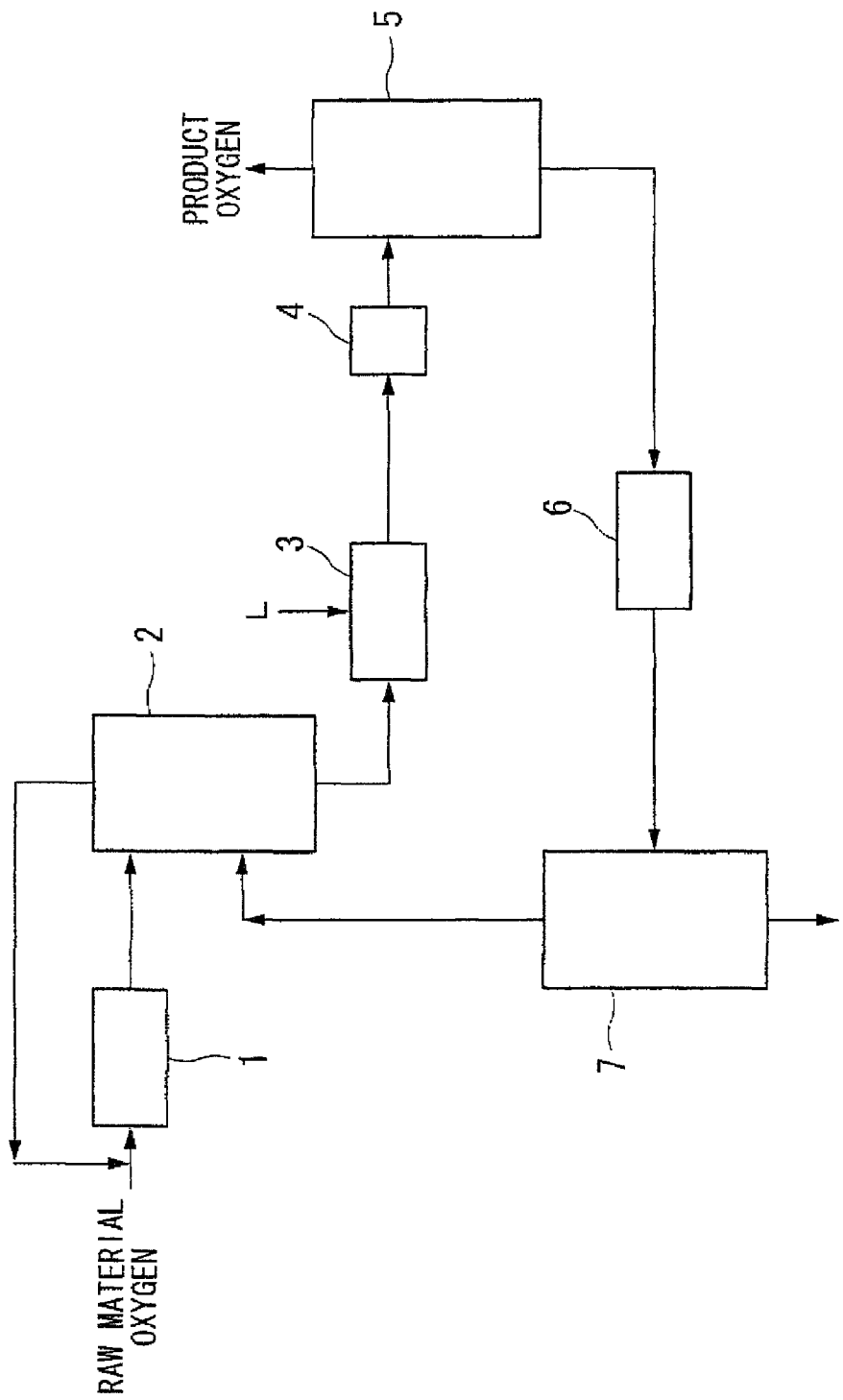
FIG. 3 is a schematic structural diagram illustrating a conventional enrichment apparatus.

Further, in those cases where a thermosyphon system is used for the reboiler 17, a gas-liquid separation unit must be provided. In those cases where the internal diameter at the bottom of the column is reduced, a gas-liquid separation unit 21 can be provided within the bottom portion of the distillation column 13, as illustrated in FIG. 2.

In the second distillation step, once the oxygen concentration within the reflux liquid liquefied by the condenser 16 has reached a high purity level, a portion of the reflux liquid is collected in a liquid product storage tank 20. In those cases where the liquid product storage tank 20 is omitted, the condenser 16 may also function as the storage tank, so that the liquid oxygen is extracted directly from the condenser.

Once the oxygen containing the enriched target heavy oxygen isotope (the product oxygen) has been collected within the liquid product storage tank 20, the line to the liquid product storage tank 20 is closed. The temperature of the liquid product storage tank 20 is then raised, and the product oxygen gas is extracted.

At this point, the top of the distillation column 13 is in a diluent gas rich state.

(Third Distillation Step: Separation of Oxygen and Diluent Gas)

The ozone remaining inside the distillation column 13 at the completion of the second distillation step contains a significantly reduced concentration of the target heavy oxygen isotope. Accordingly, the method enters a third distillation step where the ozone that has been concentrated in the bottom of the column is decomposed to form oxygen, which is subsequently discharged from the system.

In the second distillation step, once the line to the liquid product storage tank 20 has been closed, gas supply to the photoreaction cell 14 is halted, and the bypass valve 19 is closed, so that all of the upward gas flow from the reboiler 17 is introduced into the ozone decomposition device 15. The ozone is non-selectively decomposed into oxygen, and the resulting oxygen is returned to the distillation column 13 as an upward gas flow.

In the third distillation step, oxygen is concentrated at the top of the column, whereas the diluent gas is concentrated at the bottom of the column. The oxygen concentrated at the top of the column is discharged from the system as waste oxygen.

Once the oxygen has been discharged, the inside of the distillation column 13 contains only the diluent gas, and therefore the method can return to the first distillation step.

The rare gas (krypton or xenon) or the chlorofluorocarbon used as the diluent gas is expensive, and chlorofluorocarbons have an additional problem in that release of the gas into the atmosphere is environmentally undesirable, and as a result, the diluent gas is preferably reused repeatedly.

In the embodiment described above, in order prevent any deterioration in the separation performance of the distillation column 13, a bypass line (the bypass valve 19) that is able to regulate the gas flow is provided between the distillation column 13 and the photoreaction cell 14 separately from the recirculation line, thereby enabling the upward gas flow required by the distillation to be maintained. As a result, the gas flow rate flowing into the photoreaction cell 14 can be altered to match the quantity of ozone reacted within the photoreaction cell 14, which enables an efficient and stable distillation to be conducted.

The method of the present invention is a batch process in which the target oxygen is obtained only in the second distillation step, but not only does the method require only a single distillation column, meaning equipment costs can be kept to a minimum, but the quantity of diluent gas used can be reduced to approximately ⅓ of conventional quantities. Furthermore, the time required for cooling the distillation column during operation is reduced, enabling the operating time to be significantly shortened.

EXAMPLES

Using an enrichment apparatus having the structure illustrated in FIG. 1, $^{17}O$ was enriched, and a process for producing 0.5 kg (calculated as an $H_2O$ equivalent value) per year was designed. The raw material oxygen had a natural abundance ratio of the isomers ($^{16}O$=99.759% (atom %, this also applies to all subsequent values), $^{17}O$=0.037%, $^{18}O$=0.204%).

$^{16}O^{16}O^{17}O$ was selected as the target ozone isotopologue for decomposition within the photoreaction cell.

A wavelength of 992 nm was used as the laser light wavelength for decomposing this ozone isotopologue. The laser output was set to 3 W and the absorption cross-sectional area was set to $3.0 \times 10^{-23}$ cm$^2$. The pressure within the photoreaction cell was set to 13 kPa, the temperature was set to 200 K, the light path length was 30 m, the residence time within the cell was 1,800 seconds, the light utilization efficiency was 0.05, and the quantity of selective decomposition of other ozone isotopologues decomposed at the same time as the decomposition of the target isotopologue was 3.3 relative to a value of 1 for the target isotopologue.

Under these conditions, the enriched $^{17}O$ within the product oxygen represented 7.8 atom %.

INDUSTRIAL APPLICABILITY

The present invention is able to provide enrichment of heavy oxygen isotopes wherein the entire apparatus can be kept compact, enabling a reduction in equipment costs, and in which the operation is safe and can be conducted with good stability. Accordingly, the present invention is very useful industrially.

The invention claimed is:

1. A method of enriching a heavy oxygen isotope by distillation, comprising:
    a first distillation step (a) of feeding oxygen and ozone generated by an ozonizer into a distillation column filled with a diluent gas, and separating the oxygen, and the ozone and the diluent gas;
    a step (b) of discharging the oxygen from a top of the distillation column;
    a step (c) of depressurizing the distillation column;
    a photodecomposition step (d) of introducing a mixed gas of the ozone and the diluent gas from a bottom of the distillation column into a photoreaction cell, and irradiating the mixed gas with a laser light to selectively decompose the ozone containing the heavy oxygen isotope;
    a second distillation step (e) of returning non-decomposed ozone and oxygen containing the heavy oxygen isotope obtained in the step (d) to the distillation column, and separating the oxygen, and the ozone and the diluent gas;
    a step (f) of liquefying the oxygen containing the heavy oxygen isotope using a condenser provided at the top of the distillation column, and extracting the oxygen as a product oxygen;
    a step (g) of extracting the non-decomposed ozone from the distillation column, decomposing the ozone into oxygen using an ozone decomposition device, and then returning the oxygen to the distillation column;
    a third distillation step (h) of separating the oxygen and the diluent gas; and
    a step (i) of externally discharging the oxygen separated in the step (h), wherein
    the first through third distillation steps are all conducted within a single distillation column.

2. A method of enriching a heavy oxygen isotope according to claim 1, wherein the step (c) is conducted by altering operating conditions of the condenser.

3. A method of enriching a heavy oxygen isotope according to claim 1, wherein a driving force for returning the gas to the distillation column in the step (d) is generated by a pressure difference caused by a liquid head at the bottom of the distillation column.

4. A heavy oxygen isotope enrichment apparatus for conducting a method of enriching a heavy oxygen isotope according to claim 1, the apparatus comprising at least:
    an ozonizer that generates ozone from oxygen,
    a single distillation column that conducts the steps (a), (e) and (h),
    a photoreaction cell that selectively decomposes the ozone containing the heavy oxygen isotope, and
    an ozone decomposition device.

5. A heavy oxygen isotope enrichment apparatus according to claim 4, wherein an internal diameter at a bottom of the distillation column is smaller than internal diameters of other sections of the distillation column.

6. A heavy oxygen isotope enrichment apparatus according to claim 4, wherein a gas-liquid separation unit is provided at a bottom of the distillation column.

* * * * *